Aug. 24, 1965 W. A. ANDERSON 3,202,908
QUANTUM RESONANCE METHOD AND APPARATUS
Filed March 9, 1962
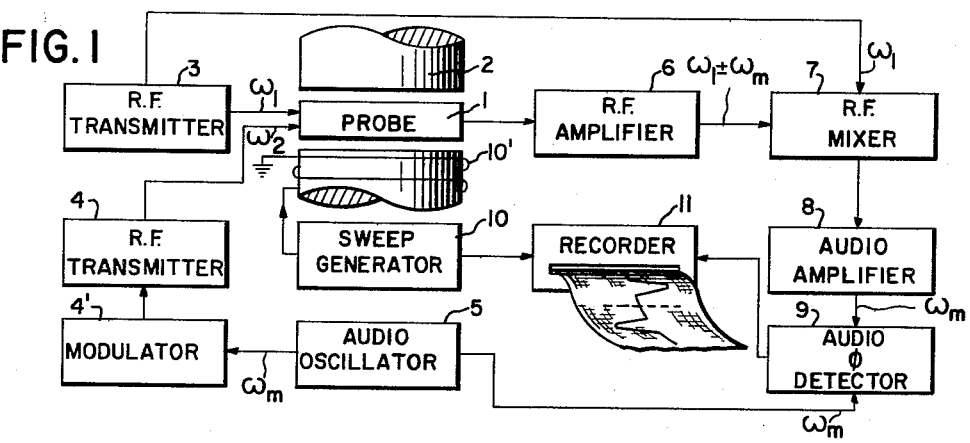
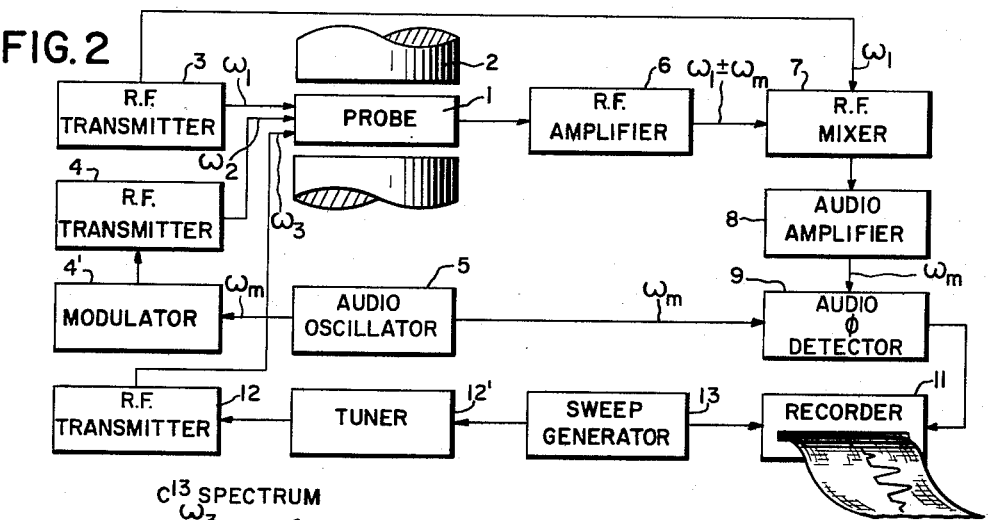
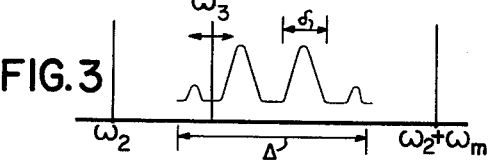
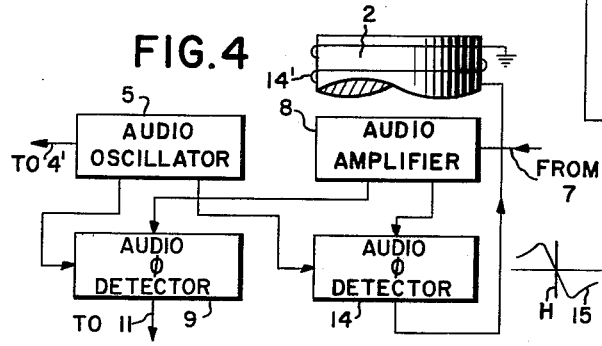
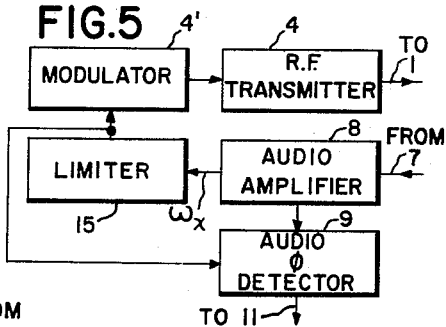
INVENTOR.
WESTON A. ANDERSON
BY
ATTORNEY United States Patent Office 3,202,908
Patented Aug. 24, 1965

3,202,908
QUANTUM RESONANCE METHOD AND
APPARATUS
Weston A. Anderson, Palo Alto, Calif., assignor to
Varian Associates, Palo Alto, Calif., a corporation of
California
Filed Mar. 9, 1962, Ser. No. 178,694
13 Claims. (Cl. 324—.5)

The present invention relates in general to quantum resonance devices, and more particularly to novel double resonance methods and apparatus.

Many valuable non-destructive analysis techniques are based on the quantum resonance properties of fundamental particles. For example, a high resolution spectrum of the nuclear magnetic resonance frequencies of an organic compound may be used to investigate or identify its chemical structure, as this structure determines the magnetic interaction properties of the different gyromagnetic nuclei in a single molecule.

A significant limitation exists with respect to such high resolution spectroscopy in that not all elements have useful magnetic resonance properties. For example, the only isotope of carbon having a gyromagnetic nucleus, that is one having a net nuclear magnetic moment, is $C^{13}$, and the sensitivity of signals obtained directly from this gyromagnetic nucleus is undesirably low.

In 1954 an experiment (reported in 96 Physical Review 543) was performed in which the $C^{13}$ resonance frequency was measured by observing the effect of $C^{13}$ transitions on the $C^{13}$-$H^1$ spin-spin coupling multiplet splitting of the more sensitive proton ($H^1$) resonance in a sample of $CH_3I$ enriched to a 51% abundance of $C^{13}$. Heretofore, however, such a double resonance technique has not been useful for routine high resolution spectroscopy for the reason that the signals from coupled protons in molecules containing $C^{13}$ are obscured by signals from uncoupled protons in molecules containing the common isotope $C^{12}$. For example, in a sample having the natural 1.1% abundance of $C^{13}$, the spectral lines arising from small $C^{13}$-proton coupling constants are completely masked by the nearby uncoupled proton line which is approximately 200 times stronger.

A principal object of the present invention is the provision of a double resonance technique in which signals are selectively obtained from a first group of resonant particles which are coupled to a second group of resonant particles.

The main feature of the present invention is the provision in a double resonance apparatus of means for monitoring the resonance of a first group of particles while modulating the excitation of resonance in a second group of particles which is coupled to said first group.

Another feature of the present invention is the provision of means in accordance with the preceding paragraph including means for detecting the modulation in the resonance of said first group which results from modulating the resonance excitation of said second group.

Still another feature of the present invention is the provision of means in accordance with the preceding paragraph wherein said second group of particles is excited at a frequency offset from the central resonance frequency thereof, and said excitation is modulated at a frequency establishing side band resonance of said first group of particles.

These and other features and advantages of the present invention will be more apparent after a perusal of the following specification taken in connection with the accompanying drawings wherein:

FIG. 1 is a block diagram of one form of high resolution magnetic resonance spectrometer in accordance with the present invention, FIG. 2 is a block diagram of another form of high resolution magnetic resonance spectrometer in accordance with the present invention, FIG. 3 is a magnetic resonance frequency spectrum plot used to aid in the explanation of FIGS. 1 and 2, and FIGS. 4 and 5 are block diagrams of different forms of field-frequency stabilization systems for use with the spectrometer of FIG. 2.

For the sake of simplicity in describing the various embodiments, the first and second groups of particles will be designated as protons and $C^{13}$ nuclei, respectively. It should be understood, however, that the techniques of the present invention are useful for other particles including, for example, other gyromagnetic nuclei and unpaired electrons.

Referring now to FIG. 1, the probe 1 contains a sample of an organic solution positioned in the unidirectional polarizing field of an electromagnet 2. A first R.F. transmitter 3 supplies an alternating magnetic field to the probe sample at a frequency $\omega_1$ in the region of the proton magnetic resonance frequency, and a second R.F. transmitter 4 supplies a field at a frequency $\omega_2$ in the region of the $C^{13}$ nuclear magnetic resonance frequency, both of these alternating fields being directed substantially at right angles to the polarizing field. For a polarizing field strength of 14.1 kilogauss, $\omega_1$ is approximately 60 mc./s. and $\omega_2$ is approximately 15.1 mc./sec.

The output of the transmitter 4 is modulated at an audio frequency $\omega_m$ by audio frequency oscillator 5 coupled to modulator section 4' thereof. This modulation may be either a frequency modulation or an amplitude modulation. In a preferred embodiment the signal of oscillator 5 drives a variable reactance in the transmitter 4 to produce frequency modulation.

In order to avoid overlapping spectral presentation, $\omega_m$ is chosen to be larger than the spectral frequency range $\Delta$ of interest, generally about 500 to 3,000 c.p.s. As seen in FIG. 3, the modulated output of transmitter 4 has a side band component which differs from the carrier frequency $\omega_2$ by an amount $\omega_m$. The two frequency components $\omega_2$ and $\omega_2+\omega_m$ are offset from the center of the $C^{13}$ spectrum by an amount, for example, 1,000 c.p.s., which is of the same order of magnitude as $\Delta$. When the amplitude of the modulated probe field established by transmitter 4 (expressed in frequency units through the gyromagnetic ratio $\gamma$ for $C^{13}$) is also of the order of magnitude of $\Delta$, then this field will be effective to induce resonance transitions of the $C^{13}$ nuclei which modulate, but do not destroy, proton-$C^{13}$ spin-spin coupling. This modulation thereby modulates the resonance of protons which are coupled to the $C^{13}$ nuclei, but does not modulate the resonance of uncoupled protons.

The probe 1 is of any suitable design known in the gyromagnetic resonance art which performs the function of altering the coupling of R.F. power from the transmitter 3 to a receiver amplifier 6 in accordance with the gyromagnetic resonance of particles, in this case protons, contained in the probe. For example, the probe may be of the crossed-coil induction type or of the single-coil absorption type.

Under conditions of simultaneous $C^{13}$ and proton resonance the received signal will be modulated due to the coupled modulation of the proton resonance, and this modulation may be detected to provide a signal selectively responsive to the coupled protons. In this particular embodiment, the modulation is observed by mixing the received signal with a sample of the transmitter signal in R.F. mixer 7, thereby obtaining an output at the audio modulation frequency $\omega_m$ which is amplified by audio amplifier 8 and fed to the audio phase detector 9 which also receives a reference signal at $\omega_m$ from audio oscillator 5. The output of the detector 9 is then a D.C.

signal which varies in accordance with the coupled proton signal. Selection between the so-called absorption or V-mode signal and the dispersion or U-mode signal is obtained through an adjustment of the relative phase of the input signals to phase detector 9.

The signal sensitivity at large modulation frequencies is improved by using side band resonance techniques to excite the proton resonance. In this case, the frequency of generator 3 is offset from the central or Larmor proton resonance frequency by an integer (usually one) times $\omega_m$.

Sweep generator 10, which is of a conventional sawtooth type, sweeps through the resonance with a relatively long period on the order of 1–10 minutes to yield a spectral trace on graphic recorder 11 which clearly shows the spin-spin splitting of the coupled proton resonance (into mutually inverted lines) whereas the signal from uncoupled protons at the center position (dashed line) is eliminated.

More generally, it may be observed that all lines in the proton spectrum are eliminated except those arising from that group of protons which is coupled to the particles undergoing modulated resonance. For example, if the sample contained an element such as boron which has two isotopes of substantially different nuclear magnetic resonance frequencies, it would be possible by exciting modulated resonance with respect to one of said isotopes to display only those proton lines arising from coupling with said isotope.

As shown, generator 10 sweeps the spectrum by sweeping the polarizing field through bias coil 10'; alternatively, the frequency of transmitter 3 may be swept.

FIG. 2 shows a system in which the chemically shifted lines in the $C^{13}$ spectrum are observed by introducing a third alternating magnetic field to the probe 1 from a transmitter 12. In practice, it may be convenient to use only one basic R.F. generator and derive the separate R.F. transmitter signals by suitable frequency synthesis networks. This third field is directed substantially at right angles to the polarizing field with an amplitude in frequency units on the order of the width $\delta$ of a single line, typically 0.1 to 1.0 c.p.s.

With the transmitter 3 and polarizing field set for proton resonance at the center of one of the multiplet lines shown in the trace of FIG. 1, the $C^{13}$ resonances are successively swept through at a low rate by saw-tooth sweep generator 13 which drives the frequency $\omega_3$ of transmitter 12, via tuner 12', over the range $\Delta$ as seen in FIG. 3. As the frequency $\omega_3$ passes through a $C^{13}$ line, the coupling of the $C^{13}$ nuclei associated with this line to the resonant protons is reduced so that the amplitude of the recorded proton signal follows the $C^{13}$ spectrum.

In order to stabilize the system of FIG. 2, it is desirable to include a field-frequency control which insures that the ratio between the frequency of the transmitter 3 to the intensity of the polarizing field of magnet 2 is locked to a proton resonance line. This control line may be derived from a separate control sample, or from either coupled or uncoupled lines in the sample under analysis. Two particularly convenient locking arrangements, which utilize the same signal information as is used for analytical purposes, are shown in FIGS. 4 and 5.

In FIG. 4, a second audio phase detector 14 is provided, the relative phase of the inputs thereof being adjusted to yield a dispersion mode output which controls the field of magnet 2 via bias coil 14'. As seen from the plot 15, this output displays discriminator characteristics as a function of field intensity. Thus, any tendency of the system to drift from a condition establishing resonance at a reference field intensity H gives rise to an error signal of the proper polarity for restoring resonance. In FIG. 4, this error signal is used to stabilize the field to resonance via bias coil 14'; alternatively, it may be used to stabilize the frequency of the transmitter 3.

In FIG. 5, a signal from audio amplifier 8 at a frequency $\omega_x$ is passed through a limiter 15 to remove any amplitude modulation and is then applied to the modulator 4' with the proper phase for regeneratively inducing side band resonance of the coupled protons. Thus, a free-running nuclear oscillator is provided in the place of the external oscillator 5, the frequency of this free-running oscillator always being at a correct frequency $\omega_x$ for maintaining side band resonance. This frequency $\omega_x$ depends on the resonance condition of the system which is determined by the intensity of the unidirectional polarizing field, and the sample frequency $\omega_1$, as well as the line position of the chemical shift of the sample.

It should be noted that whereas the novel apparatus of the present invention, comprising means for detecting the resonance of one group of particles while modulating the resonance of a coupled group, was originally proposed for the purpose of selectively obtaining signals from coupled particles, this apparatus is also found to have utility in more conventional double resonance spectroscopy wherein the unmodulated signals of the first group are detected. This would be accomplished in the spectrometer of FIG. 1 by obtaining the recorded signal directly from the output of R.F. mixer 7. In one such example, the resonance of the second group is modulated with a large modulation index at modulation frequency smaller than the spin coupling constant so that lines in the spectrum of the first group arising from coupling to the second group are split into a number of lines of very small amplitude and are thus essentially removed from the spectrum. As a further example, the resonance of the second group is modulated at a frequency which is approximately equal to the amplitude (expressed in units of frequency) of the alternating field exciting this resonance to thereby effect a more complete spin decoupling collapse of the multiplet pattern of the first group than has heretofore been possible.

It should be further noted that for purposes of the present invention, two coupled "groups" of gyromagnetic nuclei may include either two groups of different nuclear species, or two chemically shifted groups of the same nuclear species in a situation where the chemical shift is large compared to the spin coupling constant.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method for selectively obtaining quantum resonance signals from a first group of particles in a sample containing at least said first group of particles and a second group of particles, said first and second groups being mutually spin coupled and capable of undergoing gyromagnetic resonance quantum transitions in a magnetic field, said method comprising the steps of:
   disposing said groups in a magnetic field to define different characteristic transition frequencies for each group;
   irradiating each group with an alternating magnetic field of a frequency substantially close to at least one of said characteristic transition frequencies;
   cyclically modulating one of said alternating magnetic fields, for providing modulation for the excitation of resonance in one of said groups; and
   detecting any resultant modulation thereby effected in the resonance of the other of said groups.

2. A method according to claim 1 wherein said sample contains an element having at least two isotopes, said second group of particles being the nuclei of one of said isotopes.

3. A method according to claim 2 wherein said first group of particles are protons which are bound in molecules containing said one isotope.

4. In combination: means for accommodating a sample containing two groups of particles adapted to undergo mutually coupled quantum resonance transitions; means for exciting quantum resonance transitions in both of said groups simultaneously at different frequencies; means for cyclically modulating the excitation of resonance in one of said groups; and means for detecting the resonance of the other of said groups.

5. The combination of claim 4 wherein said resonance detection means includes means for detecting the modulation in said resonance resulting from the modulation in the excitation of said one group.

6. In combination:
  means for accommodating a sample containing two groups of particles adapted to undergo mutually coupled quantum resonance transitions;
  means for exciting quantum resonance transitions in both of said groups simultaneously at different frequencies;
  means for cyclically modulating the excitation of resonance in one of said groups;
  means for detecting the resonance of the other of said groups, wherein the particles are gyromagnetic particles positioned in a polarizing magnetic field; and said exciting means comprise means for establishing a first alternating magnetic field substantially at right angles to said polarizing field and substantially at the gyromagnetic resonance frequency of one of said groups of particles, and means for establishing a second alternating magnetic field substantially at right angles to said polarizing field and substantially at the gyromagnetic resonance frequency of the other of said groups of particles.

7. The comination of claim 6 wherein said first and second groups of gyromagnetic particles are two groups of gyromagnetic nuclei.

8. A high resolution gyromagnetic resonance spectrometer comprising: means for producing a polarizing magnetic field; a sample probe for accommodating a first and second group of gyromagnetic particles adapted to undergo spin-coupled gyromagnetic resonance transitions in said polarizing field; first transmitter means for establishing a first alternating magnetic field in said probe substantially at right angles to said polarizing field and substantially at the gyromagnetic resonance frequency of said first group of particles; second transmitter means for establishing a second alternating magnetic field in said probe substantially at right angles to said polarizing field and substantially at the gyromagnetic resonance frequency of said second group of particles; means for modulating said second transmitter means at a frequency establishing sideband resonance in said first group of particles, the frequency of said first magnetic field being offset from the central gyromagnetic resonance frequency of said first group of particles by an amount substantially equal to an integral times the frequency of said modulation means, and the frequency of said second alternating magnetic field being offset from the central gyromagnetic resonance frequency of said second group of particles by an amount which is of the order of magnitude of the spectrum width of the resonance of said second group of particles; and means coupled to said first transmitter means through said sample probe for detecting modulations in the signal coupled thereto at a frequency which is substantially equal to an integral times the frequency of said modulation means.

9. A spectrometer according to claim 8 wherein said modulation detection means includes means for mixing said probe-coupled signal with a reference signal from said first transmitter means.

10. A spectrometer according to claim 9 including a phase sensitive detector for comparing the output of said mixing means with a reference signal at said coupled signal modulation frequency, and means for recording the output of said phase sensitive detector.

11. A spectrometer according to claim 8 including means for sweeping through the resonance of said first group of particles, and means responsive to said detected modulation for recording multiplet splitting in the resonance of said first group of particles as said resonance is swept, said splitting arising from the coupling between said first and second groups of particles.

12. A spectrometer according to claim 8 including means for establishing a third alternating magnetic field in said probe substantially at right angles to said polarizing field and substantially at the gyromagnetic resonance frequency of said second group, means for sweeping the frequency of said third alternating magnetic field through the resonance of said second group of particles, and means responsive to said detected modulation for recording the spectral lines in the resonance of said second group of particles as said resonance is swept.

13. A spectrometer according to claim 12 including means for locking the ratio between the frequency of said first transmitter and the intensity of said polarizing field at a value which maintains fixed-line gyromagnetic resonance of said first species of particles.

References Cited by the Examiner

UNITED STATES PATENTS 3,126,485   3/64   Askin et al. _____ 330—4 X

OTHER REFERENCES

Rocard et al., Archives des Sciences (7th Colloque Ampere), vol. 11 (special adition), July 1958, pp. 286 to 294 incl.

Sarles et al., Physical Review, vol. 111, No. 3, Aug. 1, 1958, pp. 853–859 incl.

Anderson, Physical Review, vol. 116, No. 1, Oct. 1, 1959, pp. 87 to 98 incl.

CHESTER L. JUSTUS, *Primary Examiner.*

MAYNARD R. WILBUR, *Examiner.*